(12) United States Patent
Pollet et al.

(10) Patent No.: US 6,553,066 B1
(45) Date of Patent: Apr. 22, 2003

(54) TIME ERROR COMPENSATION ARRANGEMENT AND MULTI-CARRIER MODEM COMPRISING THE ARRANGEMENT

(75) Inventors: Thierry Pollet, Mechelen (BE); Peter Paul Frans Reusens, Laarne (BE); Miguel Peeters, Brussels (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/393,303

(22) Filed: Sep. 10, 1999

(30) Foreign Application Priority Data

Sep. 15, 1998 (EP) .............................. 98402272

(51) Int. Cl.⁷ .............................................. H03H 21/00
(52) U.S. Cl. ...................... 375/232; 375/219; 375/225; 375/226; 375/233; 375/234; 375/295; 375/325; 375/356; 375/373
(58) Field of Search ................................ 375/219, 224, 375/225, 226, 229, 230, 232, 233, 234, 295, 316, 354, 356, 371, 373, 325, 324

(56) References Cited

U.S. PATENT DOCUMENTS

| | | |
|---|---|---|
| 5,228,062 A | 7/1993 | Bingham |
| 6,181,755 B1 * | 1/2001 | Junell .......................... 375/362 |

FOREIGN PATENT DOCUMENTS

| | | |
|---|---|---|
| EP | 0 820 171 A1 | 1/1998 |
| WO | WO 96/25803 | 8/1996 |

OTHER PUBLICATIONS

Vesma, Jussi; Renfors, Markku; Rinne, Jukka: "Comparison of Efficient Interpolation Techniques for Symbol Timing Recovery" Proceedings of the 1996 IEEE Global Telecommunications Conference, vol. 2, Nov. 18–22, 1996, pp. 953–957, XP000741570, London, UK.

Nogami, H. et al.: "A Frequency and Timing Period Acquisition Technique for OFDM Systems" IEICE Transactions on Communications, vol. E79–B, No. 8, Aug. 1996, pp. 1135–1146, XP000628654.

Vojin Zivojnovic, et al.: "Design of Optimum Interpolation Filters for Digital Demodulators" IEEE International Symposium on Circuits and Systems (ISCS), vol. 1, May 3–6, 1993, pp. 140–143, XP000409954, Chicago, IL, USA.

Harris, Fred: "Performance and Design of Farrow Filter Used for Arbitrary Resampling" 1997 13$^{th}$ International Conference on Digital Signal Processing Proceedings. DSP 97, vol. 2, Jul. 2–4, 1997, pp. 595–599, XP002092624, Santorini, Greece.

Pollet, Thierry; Spruyt, Paul; Moeneclaey, Marc: "The BER Performance of OFDM Systems Using Non–Synchronized Sampling" 1994 IEEE Globecom. Communications: The Global Bridge. Conference Record, vol. 1, Nov. 28, 1994–Dec. 2, 1994, pp. 253–257, XP000488553, San Francisco, CA, USA.

* cited by examiner

Primary Examiner—Chi Pham
Assistant Examiner—Pankaj Kumar
(74) Attorney, Agent, or Firm—Sughrue Mion, PLLC

(57) ABSTRACT

A time error compensation arrangement (TCOMP) that compensates for a time error ($\epsilon$, $\Delta k$) between a transmitter sample clock in a multi-carrier transmitter and a receiver sample clock (CLK) in a multi-carrier receiver (RX1, RX2) includes a digital time correction filter (FILTER, FILTER'), operative in time domain, to compensate for a linearly increasing contribution ($\Delta k$) in the time error ($\epsilon$, $\Delta k$) and rotation means (ROTOR), operative in frequency domain, to compensate for a second, remaining contribution ($\epsilon$) in said time error ($\epsilon$, $\Delta k$).

6 Claims, 4 Drawing Sheets

TIME ERROR COMPENSATION ARRANGEMENT AND MULTI-CARRIER MODEM COMPRISING THE ARRANGEMENT

BACKGROUND OF THE INVENTION

The present invention relates to a time error compensation arrangement for compensating, in a multi-carrier receiver, a time error between a receiver sample clock of the muticarrier receiver and a transmitter sample clock in a transmitter communicating with the receiver, and further relates to a multi-carrier receiver having such a time error compensation arrangement.

Such a time error compensation arrangement and a multi-carrier receiver including such a time error compensation arrangement are already known in the art, e.g. from the United States patent U.S. Pat. No. 5,228,062, entitled 'Method and Apparatus for Correcting for Clock and Carrier Frequency Offset, and Phase Jitter in Multicarrier Modems'. More particularly, FIG. 2 of U.S. Pat. No. 5,228,062 shows a multi-carrier modem including circuitry to detect a time error resulting from a frequency difference between a transmitter clock and receiver clock, phase jitter impairments, etc., and including a digital filter—named interpolator and referred to by 310 in FIG. 2 of U.S. Pat. No. 5,228,062—to compensate for the detected time error. Although the circuitry to detect the time error and the operation thereof during a training mode and data mode is described in detail, the digital filter that compensates for the detected time error is not described in detail in the above mentioned U.S. Patent. Nevertheless, the complexity of this digital filter in terms of amount of filter coefficients and mathematical complexity of the algorithm that updates the filter coefficients is high, as will be appreciated by any skilled person. In the paragraph from line 23 to line 34 of column 8 of the cited U.S. Patent, it is even indicated that the digital filter is not essential because it may be replaced by a voltage controlled oscillator, which is a very expensive component and whose use would not be considered if the digital filter would be simple to realise.

SUMMARY OF THE INVENTION

An object of the present invention is to provide a time error compensation arrangement, and related multi-carrier receiver and time error compensating method of the above known type, but whose complexity in terms of amount of filter coefficients required to compensate for a given time error with a given accuracy, and the mathematical complexity of an algorithm for updating the filter coefficients, is reduced significantly.

According to the invention, this object is achieved by the time error compensation arrangement defined in claim 1 and the multi-carrier receiver defined in claim 5.

Indeed, whereas the known digital filter has to compensate for the complete time error, the digital time correction filter in the arrangement according to the present invention only compensates for the linearly incrementing contribution in the detected time error that results from the time frequency difference between the transmitter clock and frequency clock. Such a linearly increasing time error can be compensated for by a digital filter, operative in time domain, with low complexity. The filter coefficients thereto may be adjusted continuously in accordance with a filter coefficient updating algorithm. Such algorithms are well known in the art. The remaining contribution to the time error, which is an integer times (N−1).Δk in case the linearly incrementing contribution to be compensated for by the digital filter is limited to (N−1).Δk−N being the amount of samples in a multi-carrier symbol and Δk being the linear increment of the time error—is compensated for in frequency domain by a rotor such as the one known from European Patent Application EP 0 820 171, entitled 'Multicarrier transmitter or receiver with phase rotators'. Summarising, according to the present invention, combined time domain and frequency domain compensation for the time error between the clocks of a multi-carrier transmitter and multi-carrier receiver leads to a simplification of the required hardware and software used to implement the time error compensation arrangement.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

An additional feature of the time error compensation arrangement according to the present invention is defined in claim 2.

Indeed, as will be explained later, an embodiment of the digital time correction filter with a Farrow architecture can be realised. In such an embodiment of the present invention, the digital time correction filter comprises a parallel structure of digital filters having constant filter coefficients. The outputs of these parallel digital filters are scaled with scale factors that are time variable so that changes in clock speed difference between the transmitter clock and receiver clock can be countered by suitably adapting the scale factors. The scale factors, as will be shown later in this application, have a simple relation to the time error between transmitter and receiver so that no complex algorithm is required for updating the scale factors and no updating algorithm at all is required for the filter coefficients which are constant now.

Furthermore, an advantageous implementation of the embodiment of the present invention with time invariable filter coefficients is defined by claim 3.

Indeed, lab tests have shown that in an ADSL (Asymmetric Digital Subscriber Line) or VDSL (Very High Speed Digital Subscriber Line) environment, a time error between the multi-carrier DMT (Discrete Multi Tone) modem at the central office and the multi-carrier DMT (Discrete Multi Tone) modem at the remote client can be compensated for by a arrangement according to the present invention with time invariable filter coefficients and reduced architectural complexity. A Farrow architecture with six filter coefficients and 1 adaptable scale factor is sufficient for time error compensation in such an environment, as will be proven later in this document.

Also an advantageous feature of the present invention is defined by claim 4.

In this way, by increasing the time error contribution compensated for by rotor with the magnitude of the time error contribution to be compensated for by the digital time correction filter is minimised. Indeed, as will shown later, the linearly increasing time error contribution to be compensated for by the digital time, correction filter, would normally increase from zero to (N−1. Δk, whereas it now increases from $$-\frac{N.\Delta k}{2} \text{ to } \left(\frac{N}{2} - 1\right) \cdot \Delta k.$$

Furthermore, an advantageous additional feature of the multi-carrier receiver according to the present invention is defined by claim 6.

In this way, by upsampling the transferred multi-carrier signal before it is digitally filtered in the time error compensation arrangement and by downsampling the multi-carrier signal after it has been digitally filtered in the time error compensation arrangement, amplitude distortion of the multi-carrier signal due to the digital filtering is reduced.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
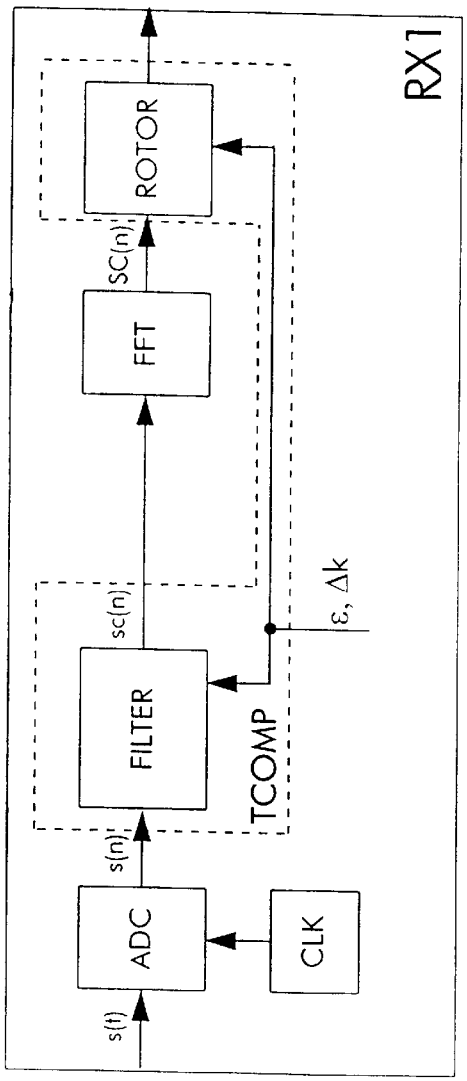
FIG. 1 is a functional block scheme of a first embodiment of a multi-carrier receiver RX1 according to the present invention.

The multi-carrier receiver RX1 drawn in FIG. 1 includes an analogue to digital converter ADC, a receiver clock CLK, a fourier transformer FFT, and a time error compensation arrangement TCOMP. The latter time error compensation arrangement TCOMP contains a digital time correction filter FILTER and a phase rotor ROTOR. The analogue to digital converter ADC, the digital time correction filter FILTER, the fourier transformer FFT and the phase rotor ROTOR are cascade coupled between an input terminal and an output terminal of the multi-carrier receiver RX1. An output of the receiver clock CLK is interconnected with a clock input of the analogue to digital converter ADC.

It is noted that the multi-carrier receiver RX1 in addition to the drawn components at least also contains a time error detector, for instance a digital phase locked loop, whose output is connected to a time error input terminal of the time error compensation arrangement TCOMP. Because the present invention is not concerned with the method used to detect the time error, this time error detector is not drawn in FIG. 1. The time error input terminal of the time error compensation arrangement TCOMP is referred to by $\epsilon$, $\Delta k$ and is internally connected to control inputs of both the digital time correction filter FILTER and the phase rotor ROTOR in the time error compensation arrangement TCOMP.

The analogue to digital converter ADC samples an incoming multi-carrier signal s(t) and thereby generates a sample sequence s(n). Subsets of samples of this sample sequence s(n) are then digitally filtered by the digital time correction filter FILTER which thereby generates a time corrected sample sequence sc(n). For more details concerning the operation of the digital time correction filter FILTER, reference is made to the description of FIG. 3 and FIG. 5 in later paragraphs of this application. The time corrected sample sequence sc(n) at the output of the digital time correction filter FILTER is transformed from time domain to frequency domain by the fourier transformer FFT which produces at its output a set of modulated carriers SC(n). The phases of the carriers in this set of modulated carriers SC(n) are rotated by the phase rotor ROTOR over an angle in proportion to the frequencies of the respective carriers so that a final time correction is applied. The so obtained frequency domain signal can be demapped if the constellation scheme used for modulation of the carriers in the transmitter that has sent the multi-carrier signal s(t) to receiver RX1 is known. The elements in the receiver RX1 responsible for demapping the carriers are not shown in FIG. 1 because their precise working is well known in the art and irrelevant in view of the present invention.

Figure 2:
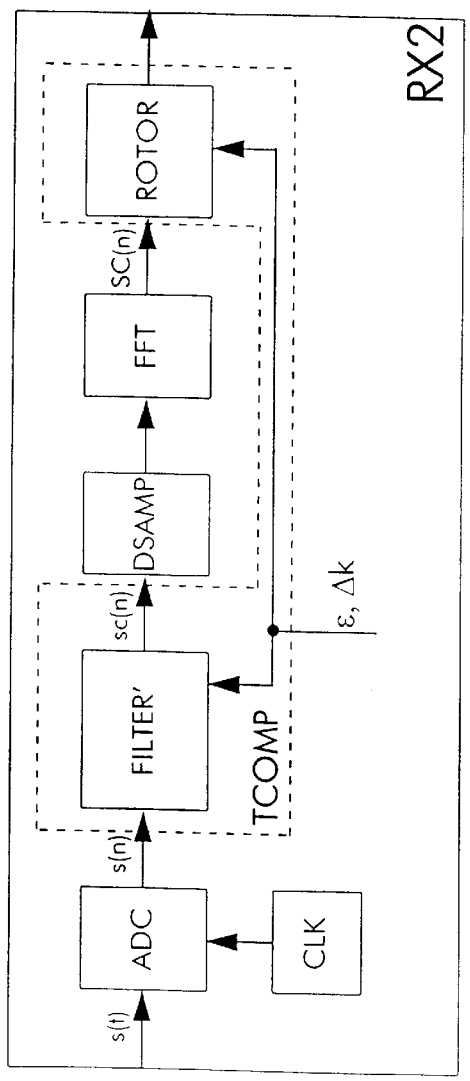
FIG. 2 is a functional block scheme of a second embodiment of a multi-carrier receiver RX2 according to the present invention.

The multi-carrier receiver RX2 drawn in FIG. 2, differs from the receiver RX1 drawn in FIG. 1 in that it includes a downsampler DSAMP, coupled between the digital time correction filter FILTER' and the fourier transformer FFT. The functional blocks ADC, CLK, FFT, TCOMP and ROTOR have the same functionality as the equally named functional blocks in the receiver RX1 of FIG. 1. The only difference is that the clock signal produced by the receiver clock CLK has a higher frequency, e.g. the double of the frequency of the clock signal produced by the receiver clock CLK in FIG. 1, so that the analogue to digital converter ADC samples the incoming multi-carrier signal s(t) at the double sample frequency. The thereby produced sample sequence s(n) is again digitally filtered by a digital time correction filter FILTER' which is described in more detail by FIG. 4, and the so obtained time corrected sample sequence sc(n) is downsampled by a factor 2 in the downsampler DSAMP. The time domain samples consequently appear with the same speed at the input of the fourier transformer FFT as in FIG. 1. The upsampling by ADC and downsampling by DSAMP help to reduce the amplitude distortion due to digital filtering in the digital time correction filter FILTER'.

Figure 3:
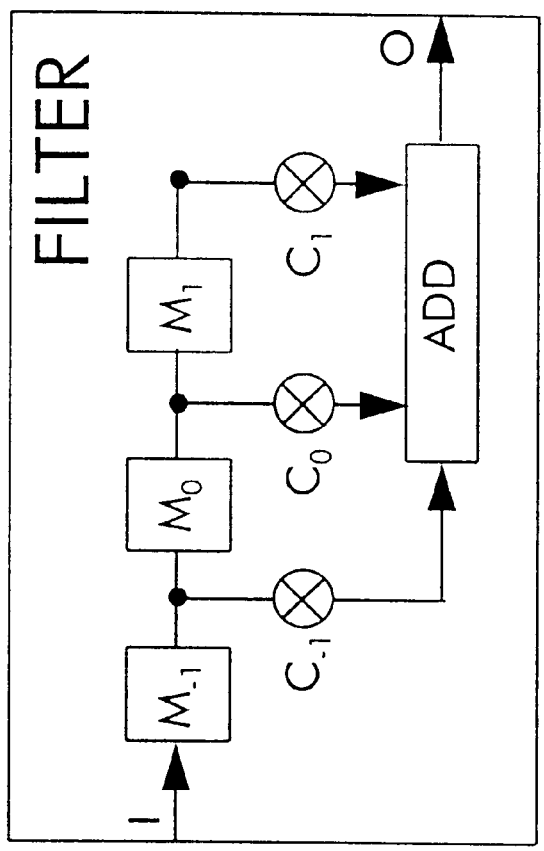
FIG. 3 is a functional block scheme of the digital time correction filter FILTER comprised by the multi-carrier receiver RX1 of FIG. 1.

The digital time correction filter FILTER in the multi-carrier receivers RX1 of FIG. 1 is drawn in FIG. 3 and has time variable filter coefficients $C_{-1}$, $C_0$ and $C_1$. The digital time correction filter FILTER drawn in FIG. 3 includes three memory cells $M_{-1}$, $M_0$, $M_1$ each capable of storing a sample of the sample sequence s(n) in FIG. 1, three multipliers $C_{-1}$, $C_0$ and $C_1$ representing the time variable filter coefficients, and an adder ADD. The memory cells $M_{-1}$, $M_0$ and $M_1$ are cascade connected, the signal input I of the digital time correction filter FILTER serving as an input for the first memory cell $M_{-1}$. The outputs of the memory cells $M_{-1}$, $M_0$ and $M_1$ are connected to inputs of the multipliers $C_{-1}$, $C_0$ and $C_1$ respectively, and outputs of these multipliers $C_{-1}$, $C_0$ and $C_1$ are connected to input terminals of the adder ADD. An output of the adder ADD serves as output terminal O for the digital time correction filter FILTER.

It is further noted that the time error input terminal $\epsilon$, $\Delta k$ of the digital time correction filter FILTER in FIG. 1 is coupled via a calculation unit to control inputs of the multipliers $C_{-1}$, $C_0$ and $C_1$. This coupling and the calculation unit are not drawn in FIG. 3. The calculation unit converts the linearly incrementing contribution to the time error into suitable filter coefficient values $C_{-1}$, $C_0$ and $C_1$.

Figure 5:
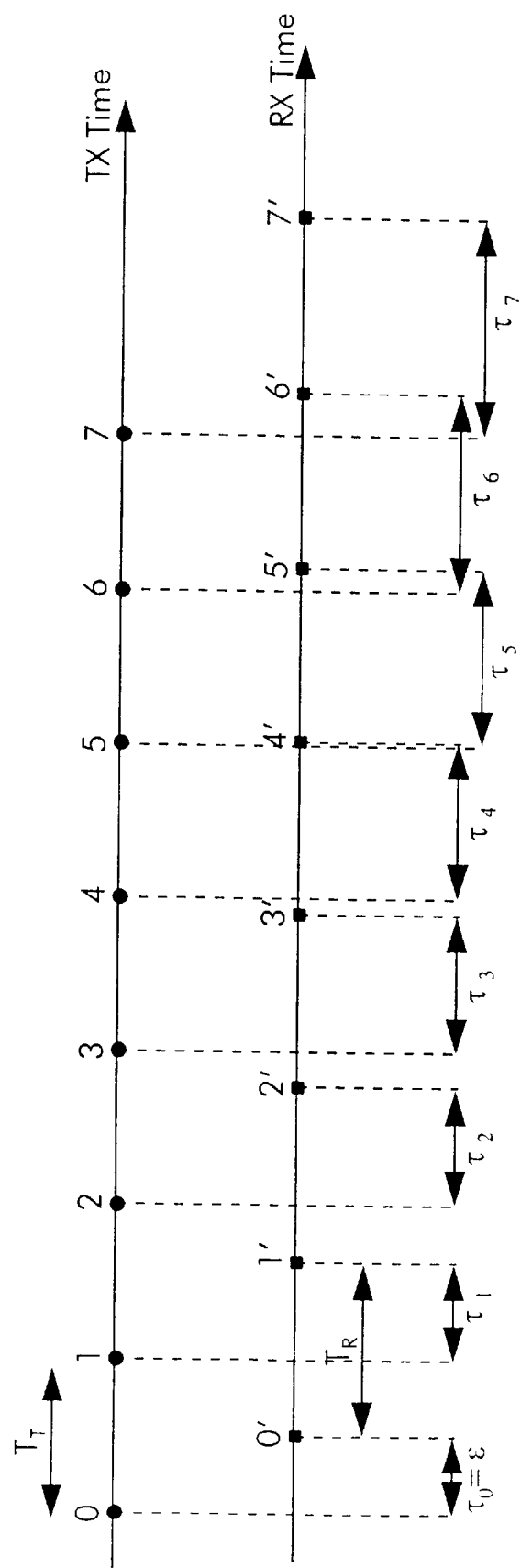
FIG. 5 is a time diagram illustrating the operation of the digital time correction filters FILTER in FIG. 1 and FILTER' in FIG. 2.

The working of the digital time correction filter FILTER of FIG. 3 is best described with reference to FIG. 5. Therein the points labelled 0, 1, 2, 3, 4, 5, 6 and 7 on the time axis TX Time represent sample times of the multi-carrier transmitter communicating with the receiver RX1 of FIG. 1, for the same multi-carrier symbol. This multi-carrier transmitter includes a transmitter includes a transmitter clock with sample period $T_T$. The points labelled 0', 1', 2', 3', 4', 5', 6' and 7' on the time axis RX Time on the other hand represent sample times of the multi-carrier receiver, RX1 of FIG. 1. The multi-carrier receiver RX1 includes a receiver clock CLK with sample period $T_R$. The transmitter clock and the receiver clock CLK are supposed to be fixed, uncontrollable clocks. As a consequence, there is a clock frequency difference between the transmitter clock and the receiver clock CLK as a result of which the time error between the receiver sample times 0', 1', 2', 3', 4', 5', 6' and 7' and the transmitter sample times 0, 1, 2, 3, 4, 5, 6 and 7 is linearly incrementing. This time error is indicated in FIG. 5 by $\tau 0$, $\tau 1$, $\tau 2$, $\tau 3$, $\tau 4$, $\tau 5$, $\tau 6$ and $\tau 7$. If the time error $\tau i$ is written as $\epsilon + \Delta k$, with i=0, 1, 2, 3, . . . , then the digital time correction filter FILTER has to compensate for the linearly incrementing contribution i.$\Delta k$. The remaining contribution $\epsilon$ to the time error is compensated for by the phase rotor ROTOR in multi-carrier receiver RX1 and typically equals an integer times N.$\Delta k$ where N is the number of samples in a multi-carrier symbol. The digital time correction filter FILTER thus has to compensate for a time error which increases stepwise from zero to (N−1).$\Delta k$, N being the number of samples per symbol. The digital time correction filter FILTER thereto transforms a subset of three samples s(n) generated by the analogue to digital converter ADC in multi-carrier receiver RX1 into a time corrected sample sc(n) which would have been obtained by receiver RX1 if the receiver clock CLK and transmitter clock would have been synchronised. The samples generated in multi-carrier receiver RX1 at sample times 3', 4' and 5' for example are linearly combined by the digital filter FILTER to generate the sample that should have been obtained by receiver RX1 at sample time 4. Afterwards, the samples generated in multi-carrier receiver RX1 at sample times 4', 5' and 6' are linearly combined by the digital filter FILTER to generate the sample that should have been obtained by receiver RX1 at sample time 5, and so on. To produce the sample at sample time 4, the digital time correction filter FILTER thereto multiplies the sample at sample time 3' with a filter coefficient $C_{-1}$, the sample at sample time 4' with a filter coefficient $C_0$ and the sample at sample time 5' with a filter coefficient $C_1$. Afterwards, the adder ADD sums the scaled samples to produce the sample at sample time 4. The filter coefficients $C_{-1}$, $C_0$ and $C_1$ are suitably determined by the already mentioned calculation unit which thereto uses well-known algorithms.

The number of filter coefficients required in the digital time correction filter FILTER can be kept reasonable because the filter FILTER only compensates for the linearly increasing contribution i.$\Delta k$ of the time error due to the clock speed difference between transmitter clock and receiver clock CLK. The remaining contribution to the time error $\epsilon$ is, as already mentioned, compensated for by the phase rotor ROTOR in the multi-carrier receiver RX1. It is this aspect of the invention that is particularly advantageous because it makes time error compensation in a multi-carrier environment feasible without the necessity to have a voltage controlled clock in either the transmitter or the receiver.

Figure 4:
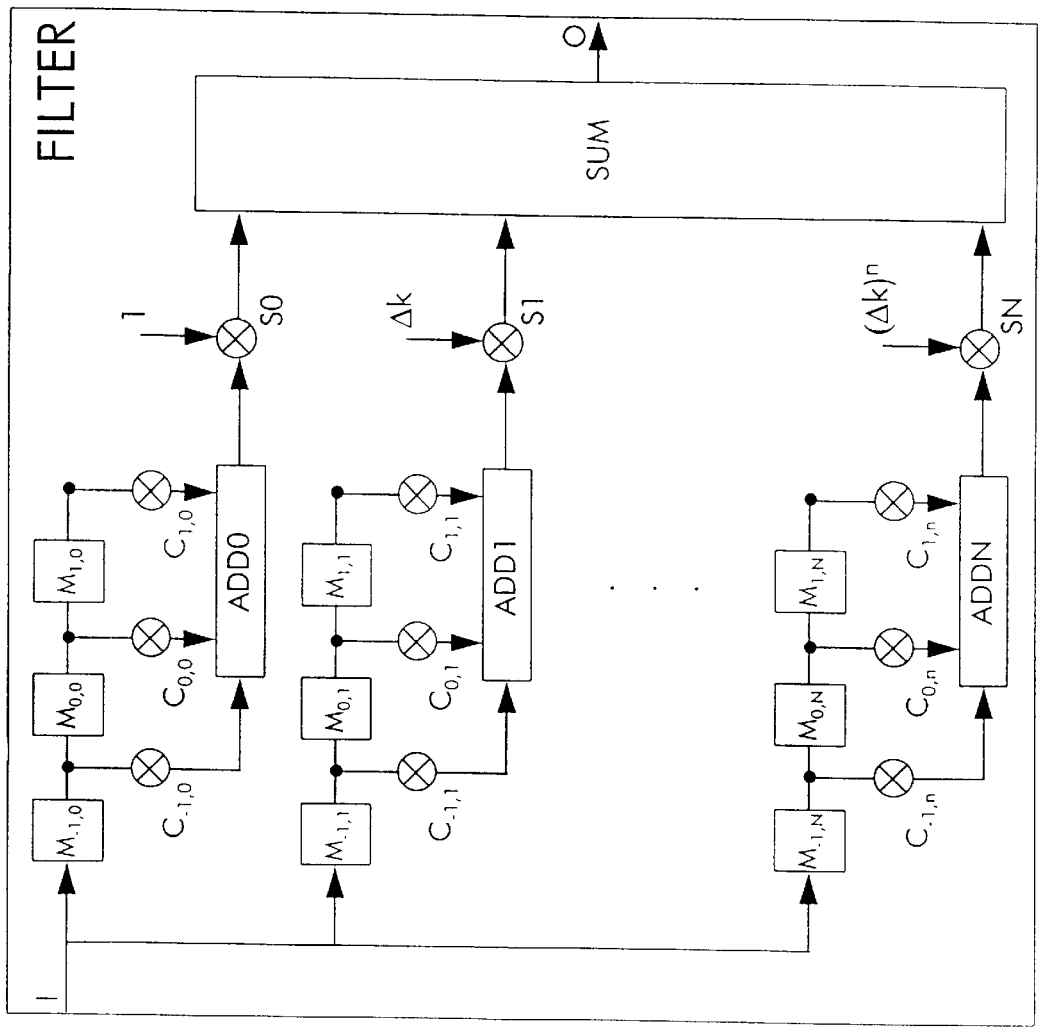
FIG. 4 is a functional block scheme of the digital time correction filter FILTER' comprised by the multi-carrier receiver RX2 of FIG. 2.

The digital time correction filter FILTER' drawn in FIG. 4 contains memory cells $M_{-1,0}$, $M_{-1,1}$, . . . , $M_{-1,N}$, $M_{0,0}$, $M_{0,1}$, . . . , . . . , $M_{0,N}$, $M_{1,0}$, $M_{1,1}$, . . . , $M_{1,N}$, filter coefficient multipliers $C_{-1,0}$, $C_{-,1,1}$, . . . , $C_{-1,N}$, $C_{0,0}$, $C_{0,1}$, . . . , $C_{0,N}$, $C_{1,0}$, $C_{1,1}$, . . . , $C_{1,N}$, adders ADD0, ADD1, . . . , ADDN, scaling means S0, S1, . . . , SN, and a summator SUM.

The memory cells $M_{-1,0}$, $M_{0,0}$, $M_{1,0}$, the filter coefficient multipliers $C_{-1,0}$, $C_{0,0}$, $C_{1,0}$, and the adder ADD0 constitute a first filter. Thereto, the memory cells $M_{-1,0}$, $M_{0,0}$, and $M_{1,0}$ are cascade coupled, the input of the first memory cell $M_{-1,0}$ being interconnected with the input terminal I of the digital time error correction filter FILTER'. Outputs of the memory cells $M_{-1,0}$, $M_{0,0}$, and $M_{1,0}$ are connected to inputs of the filter coefficient multipliers $C_{-1,0}$, $C_{0,0}$ and $C_{1,0}$ respectively and outputs of the latter filter coefficient multipliers $C_{-1,0}$, $C_{0,0}$ and $C_{1,0}$ serve as inputs for the adder ADD0. In a similar way, the memory cells $M_{-1,1}$, $M_{0,1}$, $M_{1,1}$, the filter coefficient multipliers $C_{-1,1}$, $C_{0,1}$, $C_{1,1}$ and the adder ADD1 are arranged into a second filter with the same structure as the just described one and also the memory cells $M_{-1,N}$, $M_{0,N}$, $M_{1,N}$, the filter coefficient multipliers $C_{-1,N}$, $C_{0,N}$, $C_{1,N}$ and the adder ADDN constitute a filter with this structure. The just described filters are all parallel coupled between the input terminal I of the digital time correction filter FILTER' and the summator SUM, but between the parallel filters and the summator SUM, the scaling means S0, S1, . . . , SN are inserted respectively. The output of the summator SUM is internally connected with the output terminal O of the digital time correction filter FILTER. These scaling means S0, S1, . . . , SN have scale factors 1, $\Delta k$, . . . , $(\Delta k)^N$, that depend on the measured time error and consequently are interconnected via control lines with the time error input terminal $\epsilon$, $\Delta k$ of the time error compensation arrangement TCOMP where the filter FILTER' forms part of. These control connections are not drawn in any of the figures.

The digital time correction filter FILTER' shown in detail in FIG. 4, is even more feasible than the digital time correction filter FILTER of FIG. 1 and FIG. 3, described earlier. This is so because the filter coefficients $C_{-1,0}$, $C_{-1,1}$, . . . , $C_{-1,N}$, $C_{0,0}$, $C_{0,1}$, . . . , $C_{0,N}$, $C_{1,0}$, $C_{1,1}$, . . . , $C_{1,N}$ of the digital time correction filter FILTER' in FIG. 4 are time invariable so that the above mentioned calculation unit no longer has to determine suitable filter coefficients by applying a well-known algorithm. This simplification is obtained by implementing the digital time correction filter FILTER' with a Farrow architecture. As can be understood from the previous paragraph, such a Farrow architecture is a parallel structure of digital filters with predetermined filter coefficients $C_{-1,0}$, $C_{-1,1}$, . . . , $C_{-1,N}$, $C_{0,0}$, $C_{0,1}$, . . . , $C_{0,N}$, $C_{1,0}$, $C_{1,1}$, . . . , $C_{1,N}$, each scaled by a scale factor S0, S1, . . . , SN which is time variable but which has a simple relation to the measured linear increment $\Delta k$ of the time error between transmitter and receiver sample clocks. The value of the filter coefficients $C_{-1,0}$, $C_{-1,1}$, . . . , $C_{1,N}$, $C_{0,0}$, $C_{0,1}$, . . . , $C_{0,N}$, $C_{1,0}$, $C_{1,1}$, . . . , $C_{1,N}$ and the relation between the scale factors and $\Delta k$ are determined by writing the dependency between the filter coefficients $C_{-1}$, $C_0$ and $C_1$ of FIG. 3 and the linear increment $\Delta k$ as a Taylor series:

$$C_{-1}(\Delta k) = \sum_{p=0}^{+\infty} C_{-1,p}(\Delta k)^p \text{ with } C_{-1,p} = \frac{1}{p!} \cdot \frac{d^p C_{-1}(\Delta k)}{d(\Delta k)^p}\bigg|_{\Delta k=0} \quad (1)$$

$$C_0(\Delta k) = \sum_{p=0}^{+\infty} C_{0,p}(\Delta k)^p \text{ with } C_{0,p} = \frac{1}{p!} \cdot \frac{d^p C_0(\Delta k)}{d(\Delta k)^p}\bigg|_{\Delta k=0} \quad (2)$$

$$C_1(\Delta k) = \sum_{p=0}^{+\infty} C_{1,p}(\Delta k)^p \text{ with } C_{1,p} = \frac{1}{p!} \cdot \frac{d^p C_1(\Delta k)}{d(\Delta k)^p}\bigg|_{\Delta k=0} \quad (3)$$

Herein, p! represents the factorial of p, i.e. p!=p.(p−1).(p−2). . . . .2.1, and $$\frac{d^p C_{-1}(\Delta k)}{d(\Delta k)^p}\bigg|_{\Delta k=0}$$

represents the $p^{th}$ derivative of $C_{-1}$ with respect to $\Delta k$ taken at $\Delta k=0$.

From these formulas (1), (2) and (3) it is seen how the digital time correction filter FILTER of FIG. 3 can be transformed into an equivalent digital time correction filter FILTER' having the above described Farrow architecture. Indeed, the architecture obtained by replacing $C_{-1}$, $C_0$ and $C_1$ in FIG. 3 with their equivalents expressed by equations (1), (2) and (3) is that drawn in FIG. 4. The digital time correction filter FILTER' of FIG. 4 hence also transforms samples s(n) at sample times 3', 4' and 5' into a sample that should have been obtained by the receiver RX2 at sample time 4. The number of multiplications and additions has increased compared to the digital time correction filter FILTER of FIG. 3 but the implementation is simplified because the filter coefficients are time invariable now.

In a preferred implementation of the digital time correction filter FILTER' for an ADSL (Asymmetric Digital Subscriber Line) system, the filter FILTER' just contains one filter coefficient multiplier $C_{0,0}$, in the first parallel filter scaled by S0, and five filter coefficient multipliers $C_{-2,1}$, $C_{-1,1}$, $C_{0,1}$, $C_{1,1}$ and $C_{2,1}$, in the second parallel filter scaled by S1 which is equal to $\Delta k$, the measured linear increment of the time error. Simulation tests have shown that such a simple interpolation filter, in combination with the traditional ADSL phase rotor, is sufficient to obtain synchronisation between transmitter and receiver.

A first remark is that, although the multi-carrier signal in the above described embodiment may be transported over a telephone line like in ADSL (Asymmetric Digital Subscriber Lines) or VDSL (Very High Speed Digital Subscriber Lines) systems, the applicability of the present invention is not restricted by the transmission medium via which the signal is transported. In particular, the present invention is applicable to any multi-carrier connection over a cable connection, a satellite connection, a radio link through the air, and so on.

The invention also is not only related to ADSL (Asymmetric Digital Subscriber Line) or similar systems wherein DMT (Discrete Multi Tone) modulation is used. A person skilled in the art will be able to adapt the above described embodiment so that it is applicable in any other system wherein a multi-carrier signal is transmitted from a transmitting modem to a receiving modem RX1 or RX2 and wherein the transmitter and receiver are provided with fixed sample clocks.

Another remark is that embodiments of the present invention are described above in terms of functional blocks. From the functional description of these blocks, given above, it will, be obvious for a person skilled in the art of designing electronic devices how embodiments of these blocks can be manufactured with well-known electronic components. A detailed architecture of the contents of the functional blocks hence is not given for most of them.

While the principles of the invention have been described above in connection with specific apparatus, it is to be clearly understood that this description is made only by way of example and not as a limitation on the scope of the invention.

What is claimed is:

1. An error compensation arrangement for compensating in a multi-carrier receiver a time error between a receiver sample clock of said multi-carrier receiver and a transmitter sample clock of a multi-carrier transmitter communicating with said multi-carrier receiver, said time error compensation arrangement comprising:
   a time error input terminal adapted to receive a time error signal indicative of said time error;
   a signal input terminal adapted to receive samples of a transferred signal, said samples being produced under control of said receiver sample clock;
   a digital time correction filter, operative in time domain, having an input terminal coupled to said signal input terminal and a control input terminal coupled to said time error input terminal and having filter coefficients suitably adapted to transform subsets of said samples into first time corrected samples of said transferred signal,
   wherein said time error comprises a first linearly incrementing contribution and a second contribution, and said filter coefficients are suitably adapted to compensate for said first linearly incrementing contribution; and
   phase rotation means, operative in frequency domain, for rotating the phase of carriers in said transferred signal in proportion to their respective frequencies to thereby compensate for said second contribution.

2. Time error compensation arrangement according to claim 1, wherein said filter coefficients are time invariable and said digital time correction filter further comprises scaling means whose scale factors are time variable.

3. The time error compensation arrangement according to claim 2, wherein said digital time correction filter comprises six time invariable filter coefficients and a time variable scale factor.

4. The time error compensation arrangement according to claim 1, wherein said second contribution compensated for by said rotation means is enlarged with $$\frac{N \cdot \Delta k}{2}$$

whereby N represents the number of samples in a multi-carrier symbol and $\Delta k$ represents a linear increment of said time error between two subsequent samples.

5. A multi-carrier receiver including between an input and an output thereof the cascade coupling of:
   an analogue to digital converter under control of a receiver sample clock for producing samples of a transferred signal received by said multi-carrier receiver;
   a time error compensation arrangement for compensating a time error between said receiver sample clock and a transmitter sample clock in a transmitter communicating with said multi-carrier receiver, said time error compensating arrangement comprising:

a time error input terminal adapted to receive a time error signal indicative of said time error;

a signal input terminal adapted to receive said samples of said transferred signal; and a digital time correction filter, operative in time domain, having an input terminal coupled to said signal input terminal and a control input terminal coupled to said time error input terminal and having filter coefficients suitably adapted to transform subsets of said samples into first time corrected samples of said transferred signal;

multi-carrier demodulation means, adapted to demodulate said transferred signal; and time error detection means, adapted to detect said time error and to produce said time error signal, wherein said time error comprises a first linearly incrementing contribution and a second contribution, and said filter coefficients are suitably adapted to compensate for said first linearly incrementing contribution; and phase rotation means, operative in frequency domain, for rotating the phase of carriers in said transferred signal in proportion to their respective frequencies to thereby compensate for said second contribution.

6. The multi-carrier receiver according to claim 5, wherein said receiver sample clock has a receiver sample frequency that is substantially higher than a transmitter sample frequency of said transmitter sample clock, and in that said multi-carrier receiver further comprises downsampling means coupled to said time error compensating arrangement and adapted to downsample said transferred signal from said substantially higher sample frequency to said transmitter sample frequency.

* * * * *